US012470031B2

(12) United States Patent
Takahashi

(10) Patent No.: US 12,470,031 B2
(45) Date of Patent: Nov. 11, 2025

(54) RUBBER PLUG HOLDING DEVICE AND ELECTRIC WIRE INSERTION DEVICE

(71) Applicant: Shinmaywa Industries, Ltd., Takarazuka (JP)

(72) Inventor: Yoshiki Takahashi, Takarazuka (JP)

(73) Assignee: SHINMAYWA INDUSTRIES, LTD., Hyogo (JP)

( * ) Notice: Subject to any disclaimer, the term of this patent is extended or adjusted under 35 U.S.C. 154(b) by 552 days.

(21) Appl. No.: 17/913,217

(22) PCT Filed: Mar. 22, 2021

(86) PCT No.: PCT/JP2021/011774
§ 371 (c)(1),
(2) Date: Sep. 21, 2022

(87) PCT Pub. No.: WO2021/200349
PCT Pub. Date: Oct. 7, 2021

(65) Prior Publication Data

US 2023/0216259 A1 Jul. 6, 2023

(30) Foreign Application Priority Data

Mar. 31, 2020 (JP) ................................ 2020-063690

(51) Int. Cl.
*B23P 19/00* (2006.01)
*H01R 43/00* (2006.01)
*H01R 13/52* (2006.01)

(52) U.S. Cl.
CPC ....... *H01R 43/005* (2013.01); *H01R 13/5205* (2013.01)

(58) Field of Classification Search
CPC ... H01R 43/005; H01R 43/28; H01R 43/5205
See application file for complete search history.

(56) References Cited

U.S. PATENT DOCUMENTS 5,351,385 A * 10/1994 Takano ................ H01R 43/005 29/881
5,743,002 A * 4/1998 Ito ........................ H01R 43/005 29/785

(Continued)

FOREIGN PATENT DOCUMENTS

CN 103715544 A 4/2014
CN 109546513 A 3/2019

(Continued)

OTHER PUBLICATIONS

Official Communication issued in corresponding European Patent Application No. 21779385.0, mailed on Aug. 24, 2023.

(Continued)

*Primary Examiner* — Paul D Kim
(74) *Attorney, Agent, or Firm* — Keating & Bennett, LLP

(57) ABSTRACT

A rubber plug holding device 30 includes a plurality of first clamp members 31 located around a predetermined central line CL so as to form a space S1 inner thereto in which a cylindrical rubber plug 5 is allowed to be located; a first support member 32 supporting the first clamp members 31; and a first actuator 33 driving the first clamp members 31. The plurality of first clamp members 31 include three or more first rubber plug contact portions **31*e*1, which are on the space S1 inner thereto and are to be in contact with an outer circumferential surface of the rubber plug 5. The first support member 32 supports the first clamp members 31 such that the first rubber plug contact portions 31*e*1 get closer to, or farther from, the central line CL. The first actuator 33 drives the first clamp members 31 such that the first rubber plug contact portions 31*e*1** get closer to, or farther from, the central line CL.

13 Claims, 8 Drawing Sheets

(56) References Cited

U.S. PATENT DOCUMENTS

| | | | | |
|---|---|---|---|---|
| 5,926,947 | A | 7/1999 | Takano et al. | |
| 6,134,769 | A | 10/2000 | Takano et al. | |
| 6,401,331 | B1 * | 6/2002 | Mizuno | H01R 43/005 29/771 |
| 6,671,954 | B2 * | 1/2004 | Nomoto | H01R 43/005 29/241 |
| 2018/0041020 | A1 | 2/2018 | Komori et al. | |
| 2020/0303910 | A1 | 9/2020 | Houser et al. | |

FOREIGN PATENT DOCUMENTS

| | | | |
|---|---|---|---|
| DE | 112020001375 | T5 | 12/2021 |
| EP | 2 768 097 | A1 | 8/2014 |
| JP | 60-29249 | A | 2/1985 |
| JP | 09-290332 | A | 11/1997 |
| JP | 2001-359216 | A | 12/2001 |
| JP | 2007-317495 | A | 12/2007 |
| JP | 4889257 | B2 | 3/2012 |
| JP | 2013-106465 | A | 5/2013 |
| JP | 2015-167079 | A | 9/2015 |
| WO | 2014/007275 | A1 | 1/2014 |

OTHER PUBLICATIONS

Official Communication issued in corresponding European Patent Application No. 21779385.0, mailed on Nov. 4, 2024, 60 pages.

Official Communication issued in corresponding Chinese Patent Application No. 202180025081.9, mailed on Feb. 14, 2025, 8 pages.

Official Communication issued in International Patent Application No. PCT/JP2021/011774, mailed on Jun. 8, 2021.

* cited by examiner

RUBBER PLUG HOLDING DEVICE AND ELECTRIC WIRE INSERTION DEVICE

TECHNICAL FIELD

The present invention relates to a rubber plug holding device, and an electric wire insertion device including the rubber plug holding device and inserting an electric wire into the rubber plug.

BACKGROUND ART

Conventionally, devices inserting an electric wire into a rubber plug are known. For example, Patent Literature 1 discloses a rubber plug insertion device including an electric wire holding member holding an electric wire, a rubber plug holding member having a rubber plug accommodation hole corresponding to an outer size of a rubber plug, a rubber plug supply tube supplying the rubber plug to the rubber plug holding member, and a rubber plug holding driving mechanism causing the rubber plug accommodation hole and the electric wire to get closer to each other.

CITATION LIST

Patent Literature

Patent Literature 1: Japanese Laid-Open Patent Publication No. 2013-106465

SUMMARY OF INVENTION

Technical Problem

There are various types of rubber plugs, and outer sizes thereof are not the same. However, for a conventional rubber plug insertion device as described in Patent Literature 1, a rubber plug holding member corresponding to an outer size of a rubber plug needs to be prepared, which requires a preparation time period and is costly. Actual insertion requires a replacement step of replacing the rubber plug holding member in accordance with the type of the rubber plug or requires rubber plug insertion devices provided in a number corresponding to the number of the types of the rubber plugs.

The present invention made in light of the above-described points has an object of providing a rubber plug holding device capable of holding a rubber plug of any of types having different outer sizes, and an electric wire insertion device including such a rubber plug holding device and inserting an electric wire into a rubber plug.

Solution to Problem

A rubber plug holding device according to the present invention includes a plurality of first clamp members located around a predetermined central line so as to form a space inner thereto in which a cylindrical rubber plug is allowed to be located; a first support member supporting the plurality of first clamp members; and a first actuator driving the plurality of first clamp members. The plurality of first clamp members include three or more first rubber plug contact portions that are on the space inner thereto and are to be in contact with an outer circumferential surface of the rubber plug. The first support member supports the first clamp members such that the first rubber plug contact portions get closer to, or farther from, the central line. The first actuator drives the first clamp members such that the first rubber plug contact portions get closer to, or farther from, the central line.

With the above-described rubber plug holding device, the first actuator is driven to cause the three or more first rubber plug contact portions to get closer to, or farther from, the rubber plug located in the space inner to the first clamp members. Such a rubber plug holding device allows the three or more first rubber plug contact portions to be in contact with the outer circumferential surface of the rubber plug located in the inner space, regardless of the outer diameter of the rubber plug. Therefore, the rubber plug holding device holds any rubber plug having any of various outer diameters.

In a preferred embodiment of the rubber plug holding device according to the present invention, the first clamp members are provided in the number of three or more.

With such a rubber plug holding device, the first clamp members get closer to the rubber plug in at least three directions set along the circumferential direction. Therefore, the rubber plug is held stably.

In a preferred embodiment of the rubber plug holding device according to the present invention, the first support member includes a plurality of first pivoting shafts each extending parallel to the central line and respectively supporting the first clamp members such that the first clamp members are pivotable. The first actuator pivots the plurality of first clamp members about the plurality of first pivoting shafts respectively. The plurality of first clamp members each include a first inner side surface that is on the space formed inner to the plurality of first clamp members and is structured such that different regions of the first inner side surface along a circumferential direction of the first pivoting shaft have different distances from the first pivoting shaft. The first rubber plug contact portions are provided at the first inner side surfaces and get closer to, or farther from, the central line by the first clamp members pivoting about the first pivoting shafts.

In such a rubber plug holding device, the first rubber plug contact portions are provided at the first inner side surfaces of the first clamp members, and the different regions of each of the first inner side surfaces along the circumferential direction of the first pivoting shaft have different distances from the first pivoting shaft. Therefore, mere pivoting of the first clamp members by the first actuator causes the first rubber plug contact portions to get closer to, or farther from, the central line. This simplifies the structure of the rubber plug holding device.

In a preferred embodiment of the rubber plug holding device, the first actuator includes a rotatable driving shaft. The rubber plug holding device further includes a first pulley including a ring portion having an outer engageable portion in an outer side surface thereof and an inner engageable portion in an inner side surface thereof, the first pulley being rotatable about the central line, and a transfer mechanism engageable with the outer engageable portion of the first pulley and the driving shaft of the first actuator, the transfer mechanism transferring a rotation of the driving shaft to the first pulley. The first clamp members each include a first engageable portion located inner to the ring portion in a radial direction and engageable with the inner engageable portion, the first clamp members pivoting about the first pivoting shafts by the first pulley rotating.

With such a rubber plug holding device, the first clamp members are pivoted by a simple structure of the first pulley including the outer engageable portion receiving the rotation force of the first actuator and the inner engageable portion transferring the rotation force of the first actuator to the first clamp members.

In a preferred embodiment according to the present invention, the rubber plug holding device further includes a plurality of second clamp members located around the central line so as to form a space inner thereto, in which the rubber plug is allowed to be located; a second support member supporting the second clamp members; and a second actuator driving the second clamp members. The plurality of second clamp members include three or more second rubber plug contact portions located at different positions, in a direction in which the central line extends, from those of the first rubber plug contact portions, the three or more second rubber plug contact portions being to be in contact with the outer circumferential surface of the rubber plug. The second support member supports the second clamp members such that the second rubber plug contact portions get closer to, or farther from, the central line. The second actuator drives the second clamp members such that the second rubber plug contact portions get closer to, or farther from, the central line.

Such a rubber plug holding device holds a stepped rubber plug, including portions having different outer sizes, in a preferred manner. Namely, the portion having a first outer diameter is clamped by the first clamp members and the portion having a second outer diameter is clamped by the second clamp members. Thus, the stepped rubber plug is held in a more preferred manner.

An electric wire insertion device according to the present invention inserts an electric wire into a through-hole of a rubber plug, the through-hole being along an axis of the rubber plug. The electric wire insertion device includes any one of the above-described rubber plug holding devices. The electric wire insertion device includes a rubber plug supply opening in communication with the space formed inner to the plurality of first clamp members, the rubber plug being supplied through the rubber plug supply opening; and an electric wire transportation device transporting the electric wire along the central line.

Such an electric wire insertion device includes the rubber plug holding device capable of holding any of rubber plugs having various outer diameters, and therefore, inserts an electric wire into any of rubber plugs having various outer diameters.

In a preferred embodiment according to the present invention, the electric wire insertion device further includes a detection device detecting whether or not the rubber plug is at a predetermined position, along the central line, at which the first clamp members are capable of grasping the rubber plug; and a controller connected with the first actuator and the detection device. The controller includes a first controller causing the first actuator to operate such that the first rubber plug contact portions get closer to the central line when the detection device detects that the rubber plug is at the predetermined position.

With such an electric wire insertion device, the rubber plug is grasped after the rubber plug is confirmed to be at the predetermined position at which the first clamp members are capable of grasping the rubber plug. Therefore, the rubber plug is held more certainly.

In a preferred embodiment according to the present invention, the electric wire insertion device further includes a wall against which a front end, in a rubber plug advancing direction, of the supplied rubber plug collides such that the rubber plug stops at a predetermined position, along the central line, at which the plurality of clamp members are capable of grasping the rubber plug.

With such an electric wire insertion device, the rubber plug collides against the wall to stop at the predetermined position at which the first clamp members are capable of grasping the rubber plug. Therefore, the rubber plug is held more certainly.

In a preferred embodiment according to the present invention, the electric wire insertion device further includes a controller connected with the first actuator. The controller includes a setter setting a type of the rubber plug to be supplied, a storage storing a position of the first actuator for each of types of the rubber plug, and a second controller controlling the first actuator based on the setting performed by the setter and the position stored on the storage, to control positions of the first rubber plug contact portions with respect to the central line.

With such an electric wire insertion device, for holding the rubber plug, the first rubber plug contact portions are moved to preferred positions defined in accordance with each of types of the rubber plug. Therefore, the rubber plug of the set type is grasped certainly.

In a preferred embodiment according to the present invention, the electric wire insertion device further includes a controller connected with the first actuator. The controller includes a storage and a second controller. The storage stores a pre-insertion position as a position of the first actuator before the electric wire is inserted into the rubber plug and a post-insertion position as a position of the first actuator after the electric wire is inserted into the rubber plug. The second controller controls the first actuator based on the pre-insertion position and the post-insertion position stored on the storage, to control positions of the first rubber plug contact portions with respect to the central line.

In general, the outer diameter of the rubber plug is changed by an electric wire being inserted into the rubber plug. The electric wire insertion device stores the pre-insertion position as the position of the first actuator before the electric wire is inserted into the rubber plug, and the post-insertion position as the position of the first actuator after the electric wire is inserted into the rubber plug, separately from each other. Therefore, even if the outer diameter of the rubber plug is changed by the insertion of the electric wire, the first actuator is moved to the post-insertion position, so that the electric wire is inserted into the rubber plug smoothly.

In a preferred embodiment of the electric wire insertion device according to the present invention, the first rubber plug contact portions at the post-insertion positions are located farther from the central line than the first rubber plug contact portions at the pre-insertion positions.

In general, the outer diameter of the rubber plug is increased by an electric wire being inserted into the rubber plug. With the electric wire insertion device according to the present invention, even if the outer diameter of the rubber plug is increased by the insertion of the electric wire, the first rubber plug contact portions are moved to the post-insertion positions farther from the central line than the pre-insertion positions, so that the electric wire is inserted into the rubber plug smoothly.

In a preferred embodiment according to the present invention, the electric wire insertion device further including a moving device moving the rubber plug holding device parallel to the central line.

Such an electric wire insertion device locates the rubber plug at a position, in a direction in which the electric wire is inserted, that is preferred for the insertion of the electric wire.

In a preferred embodiment according to the present invention, the electric wire insertion device further includes a controller connected with the electric wire transportation device and the moving device. The controller includes a third controller and a fourth controller. The third controller controls the electric wire transportation device to transport the electric wire from an area outside the rubber plug holding device toward the space formed inner to the plurality of first clamp members, to insert the electric wire into the rubber plug. The fourth controller controls the moving device after the electric wire transportation device starts inserting the electric wire into the rubber plug, to move the rubber plug holding device in a transportation direction of the electric wire, and controls the moving device after the rubber plug holding device is moved in the transportation direction of the electric wire, to move the rubber plug holding device in a direction opposite to the transportation direction of the electric wire.

With such an electric wire insertion device, along with the transportation of the electric wire, the rubber plug is once moved in the transportation direction of the electric wire. As a result, buckling of the electric wire is suppressed in the initial stage of the process of inserting the electric wire into the rubber plug. Then, while the electric wire is transported, the rubber plug is moved in a direction opposite to the transportation direction of the electric wire. Thus, the electric wire is inserted into the rubber plug.

ADVANTAGEOUS EFFECTS OF INVENTION

A rubber plug holding device according to the present invention holds a rubber plug of any of various types having different outer sizes.

DESCRIPTION OF EMBODIMENTS

Figure 1:
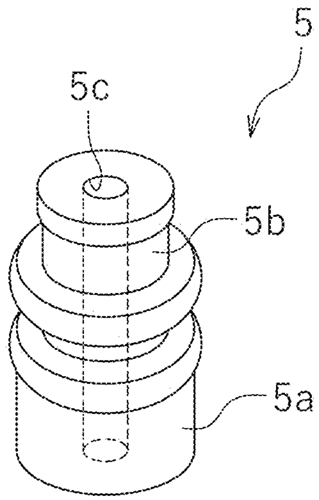
FIG. 1 is a perspective view showing an example of rubber plug.

Hereinafter, an embodiment of the present invention will be described with reference to the drawings. First, a rubber plug will be described. FIG. 1 is a perspective view showing an example of rubber plug 5. As shown in FIG. 1, the rubber plug 5 according to an example has a cylindrical shape that is axially asymmetrical. The rubber plug 5 includes a long diameter portion 5*a* and a short diameter portion 5*b*. The long diameter portion 5*a* has a diameter longer than that of the short diameter portion 5*b*. The rubber plug 5 has a through-hole 5*c* running through the rubber plug 5 along the axis thereof. The shape of the rubber plug 5 shown here is merely an example, and there is no limitation on the shape of the rubber plug 5.

Figure 2:
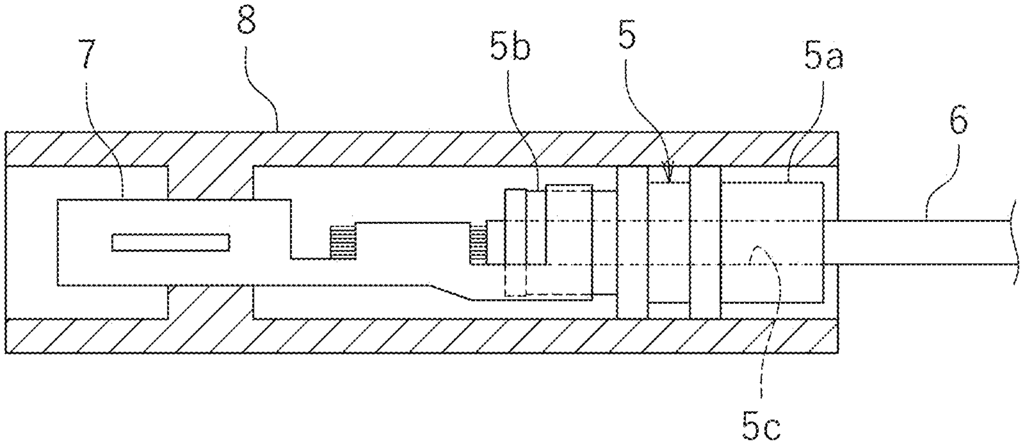
FIG. 2 shows an example of form of use of the rubber plug.

FIG. 2 shows an example of form of use of the rubber plug 5. As shown in FIG. 2, the rubber plug 5 is, for example, attached to a covered electric wire 6 (hereinafter, referred to as the "electric wire 6"). The electric wire 6 has a tip to be inserted into the through-hole 5*c* of the rubber plug 5. The electric wire 6 is inserted into the through-hole 5*c* from an opening on the long diameter portion 5*a* side and is taken out from an opening on the short diameter portion 5*b* side. Then, the cover of the tip of the electric wire 6 is peeled off, and a crimp terminal 7 is crimped to the tip. At this point, the crimping of the crimp terminal 7 causes the rubber plug 5 to be secured to the electric wire 6. In addition, an assembly of the electric wire 6, the rubber plug 5 and the crimp terminal 7 is inserted into a housing 8 provided therefor. As shown in FIG. 2, the rubber plug 5 is in contact with an inner circumferential surface of the housing 8 to prevent entrance of moisture into the housing 8. The rubber plug 5 is a water-proof rubber plug.

Figure 3:
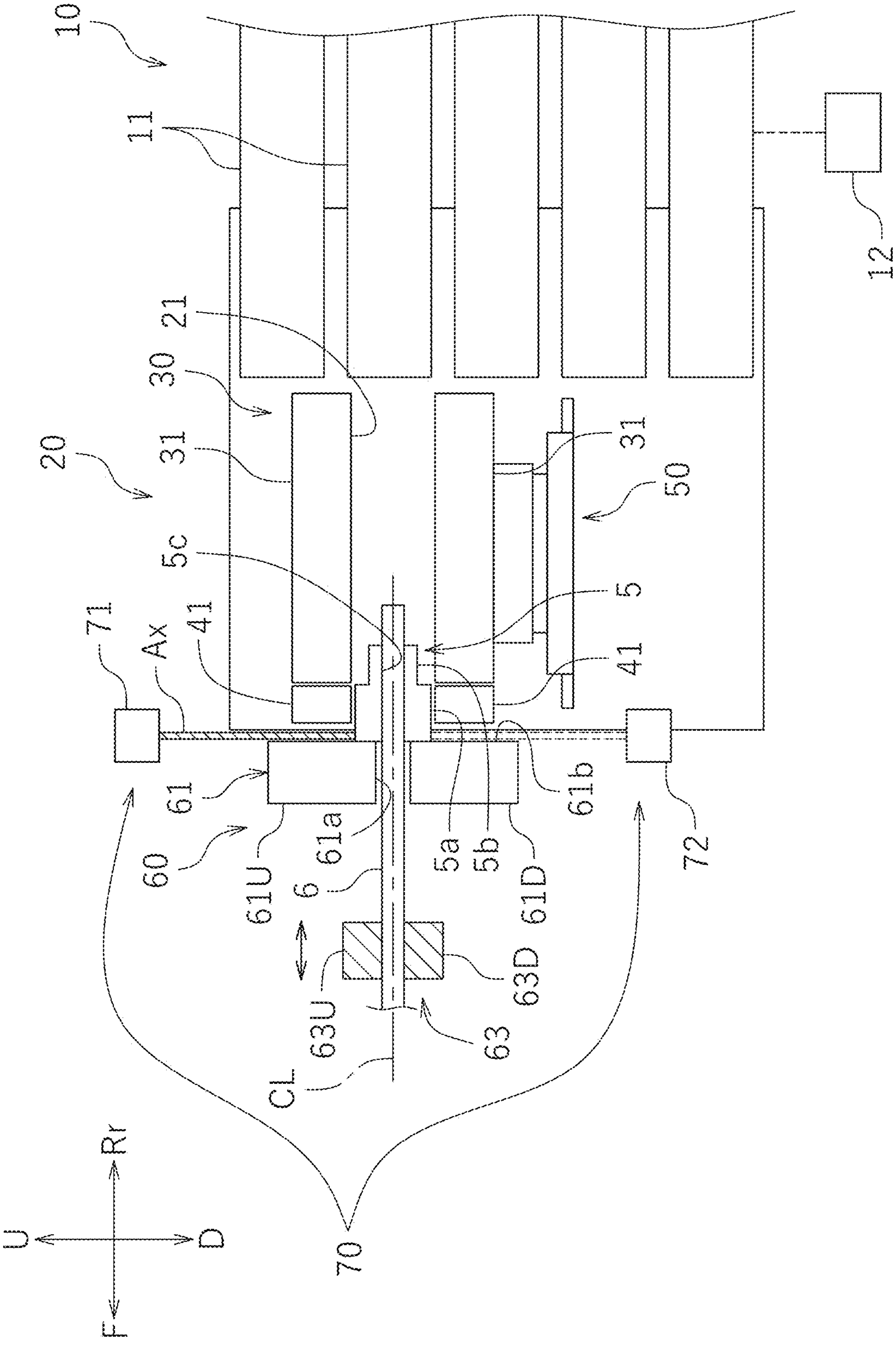
FIG. 3 is a schematic cross-sectional view of a rubber plug supply device and an electric wire insertion device according to an embodiment.

FIG. 3 is a schematic cross-sectional view of a rubber plug supply device 10 and an electric wire insertion device 20 according to an embodiment. The electric wire insertion device 20 inserts the electric wire 6 into the through-hole 5*c* of the rubber plug 5. The rubber plug supply device 10 supplies the rubber plug 5 to the electric wire insertion device 20. In the following description, the left side and the right side of FIG. 3 will be described as the front side and the rear side, respectively. The left side, the right side, the up side and the down side of the rubber plug supply device 10 and the electric wire insertion device 20 as seen from the front side will be described as the left side, the right side, the up side and the down side. In the figures referred to below, the front side, the rear side, the left side, the right side, the up side and the down side will be represented by F, Rr, L, R, U and D, respectively. It should be noted that the directions mentioned in the following description are defined merely for the sake of convenience, and do not limit the present invention in any way.

As shown in FIG. 3, the rubber plug supply device 10 includes a plurality of transportation tubes 11 and a tube selector 12. Rubber plugs 5 are each directed by a parts feeder (not shown) such that the long diameter portion 5*a* is on the front side in an advancing direction thereof, and are transported in the transportation tubes 11. The rubber plugs 5 are transported in the transportation tubes 11 by, for example, compressed air. In this embodiment, the plurality of transportation tubes 11 are provided side by side in an up-down direction. The tube selector 12 moves the plurality of transportation tubes 11 in the up-down direction. One of the plurality of transportation tubes 11 is positioned by the tube selector 12 so as to face a rubber plug supply opening 21 of the electric wire insertion device 20. As a result, the one transportation tube 11 is connected with the rubber plug supply opening 21. The rubber plug 5 in the transportation tube 11 connected with the rubber plug supply opening 21 is supplied to the electric wire insertion device 20. It should be noted that there is no specific limitation on the structure of the rubber plug supply device 10. For example, the plurality of transportation tubes may be located in a circumferential direction, and the tube selector may rotate the plurality of transportation tubes in the circumferential direction.

Figure 4:
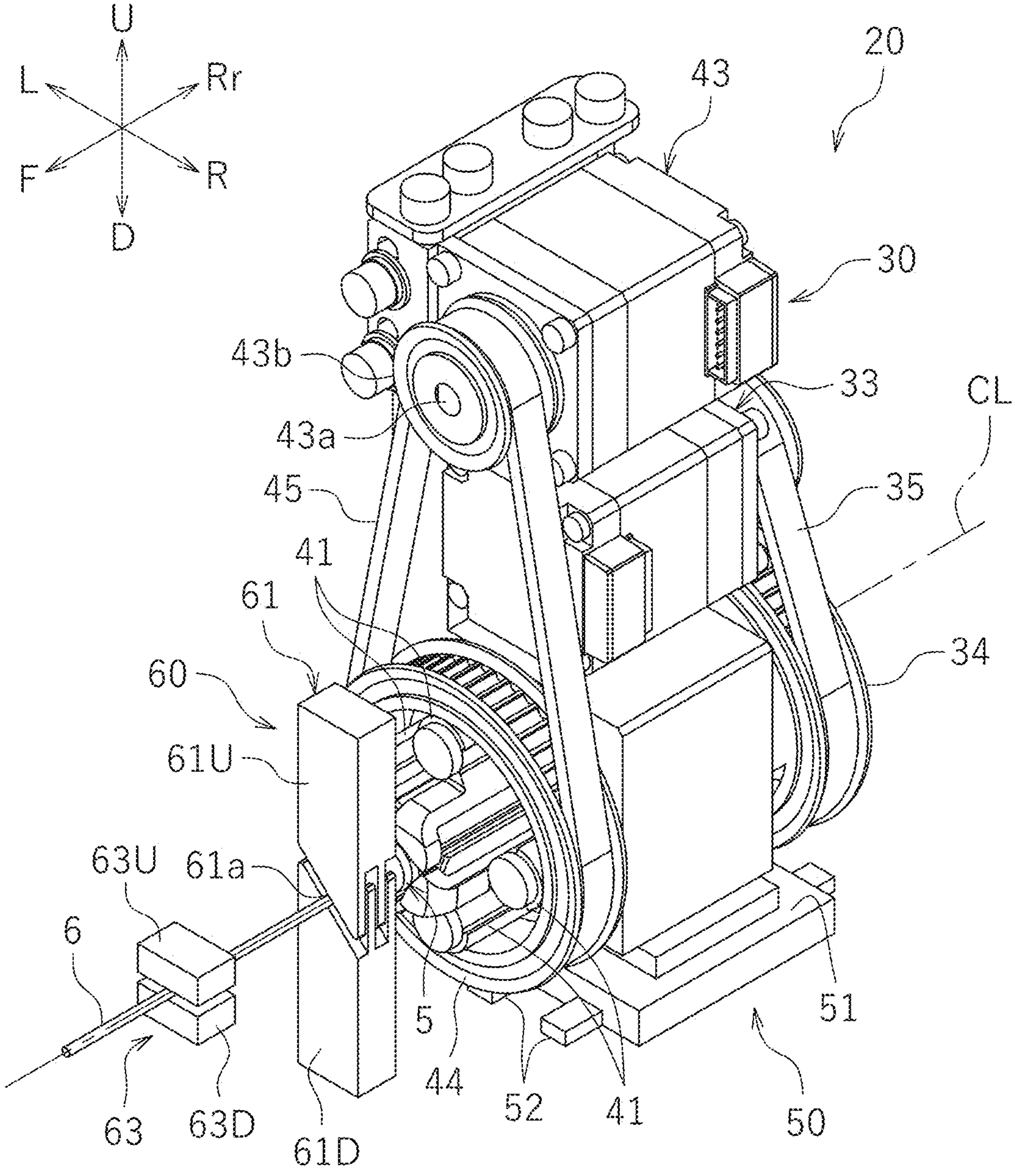
FIG. 4 is a perspective view of the electric wire insertion device.
Figure 5:
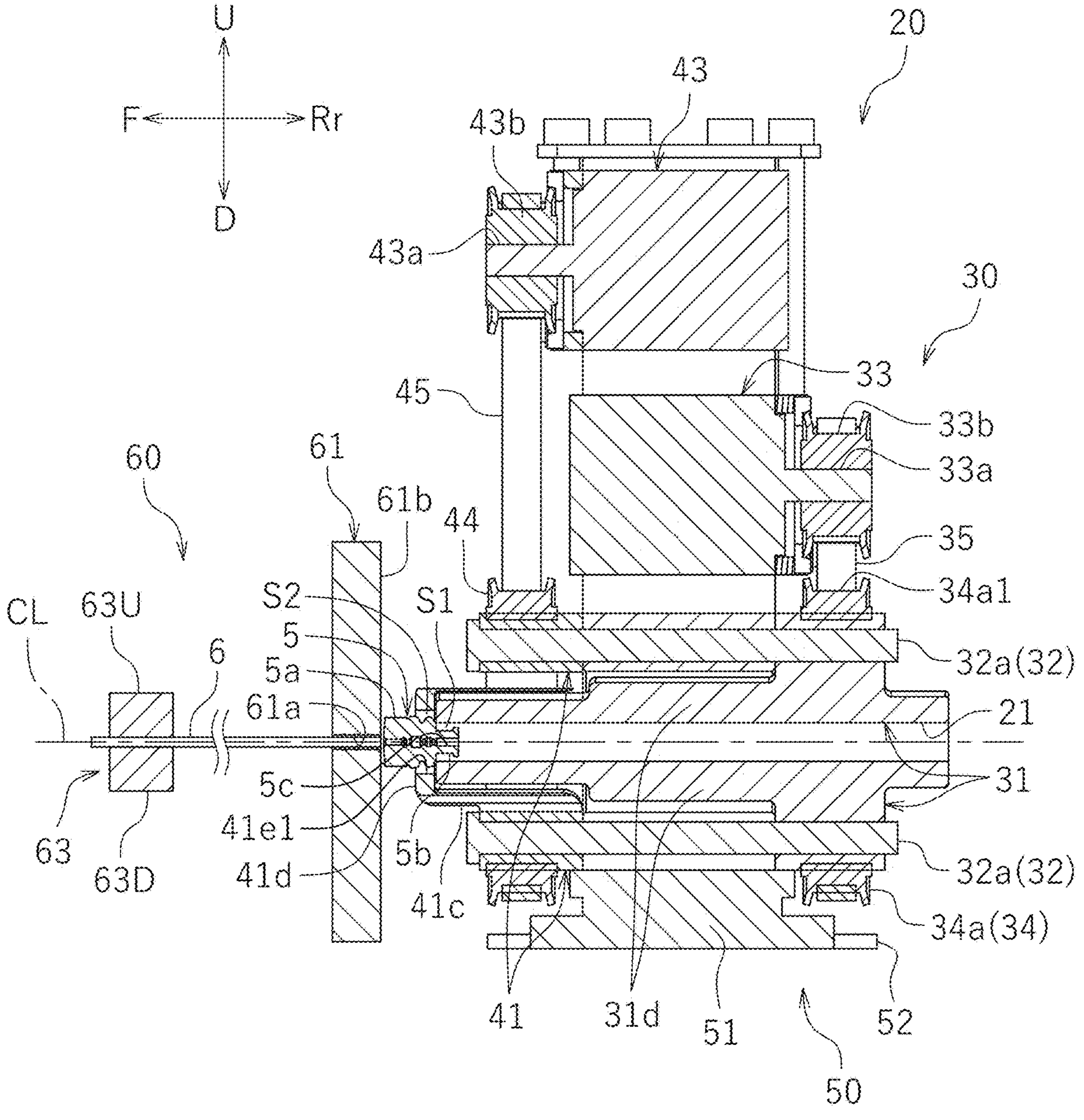
FIG. 5 is a vertical cross-sectional view of the electric wire insertion device.
Figure 6:
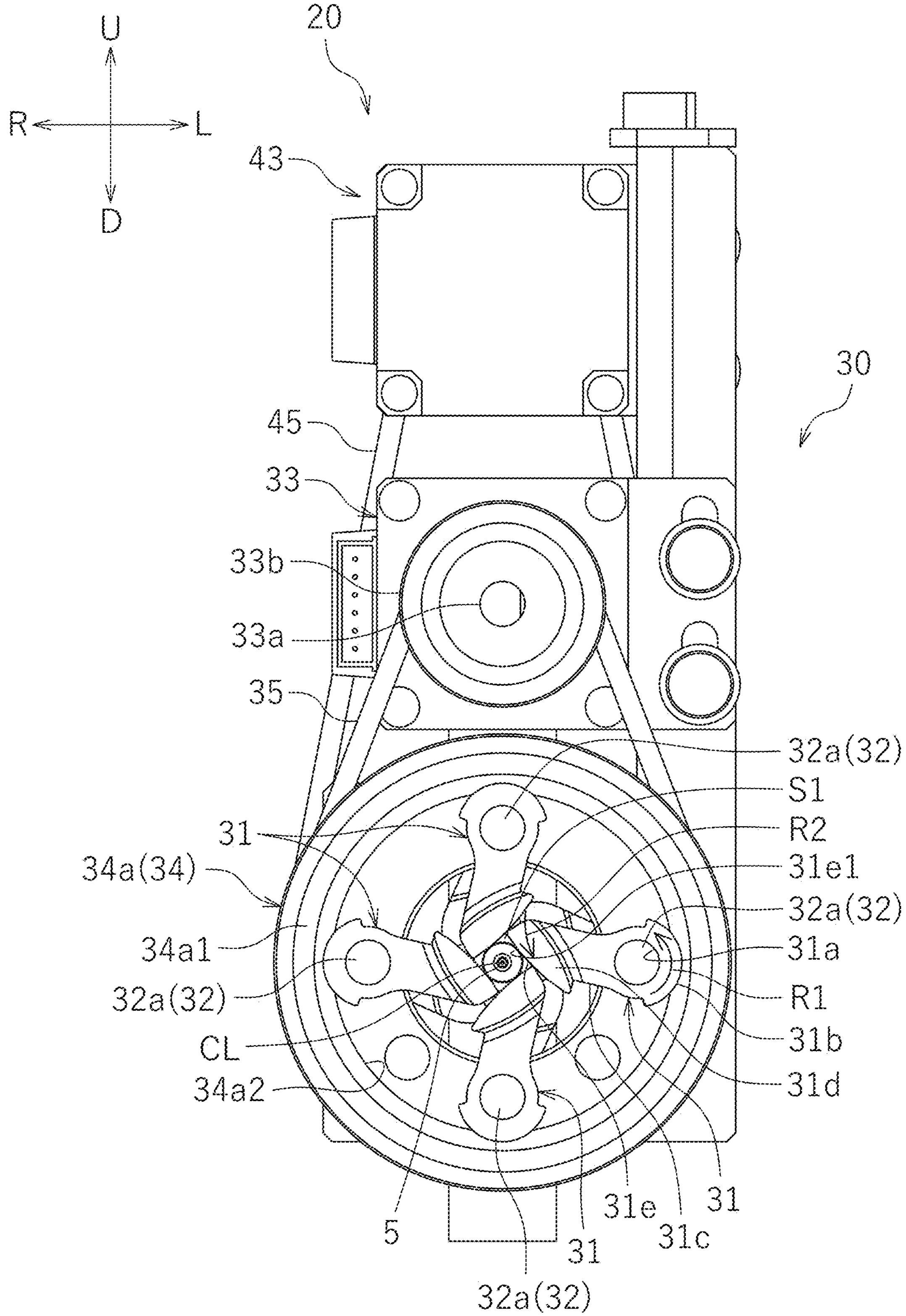
FIG. 6 is a rear view of the electric wire insertion device.
Figure 7:
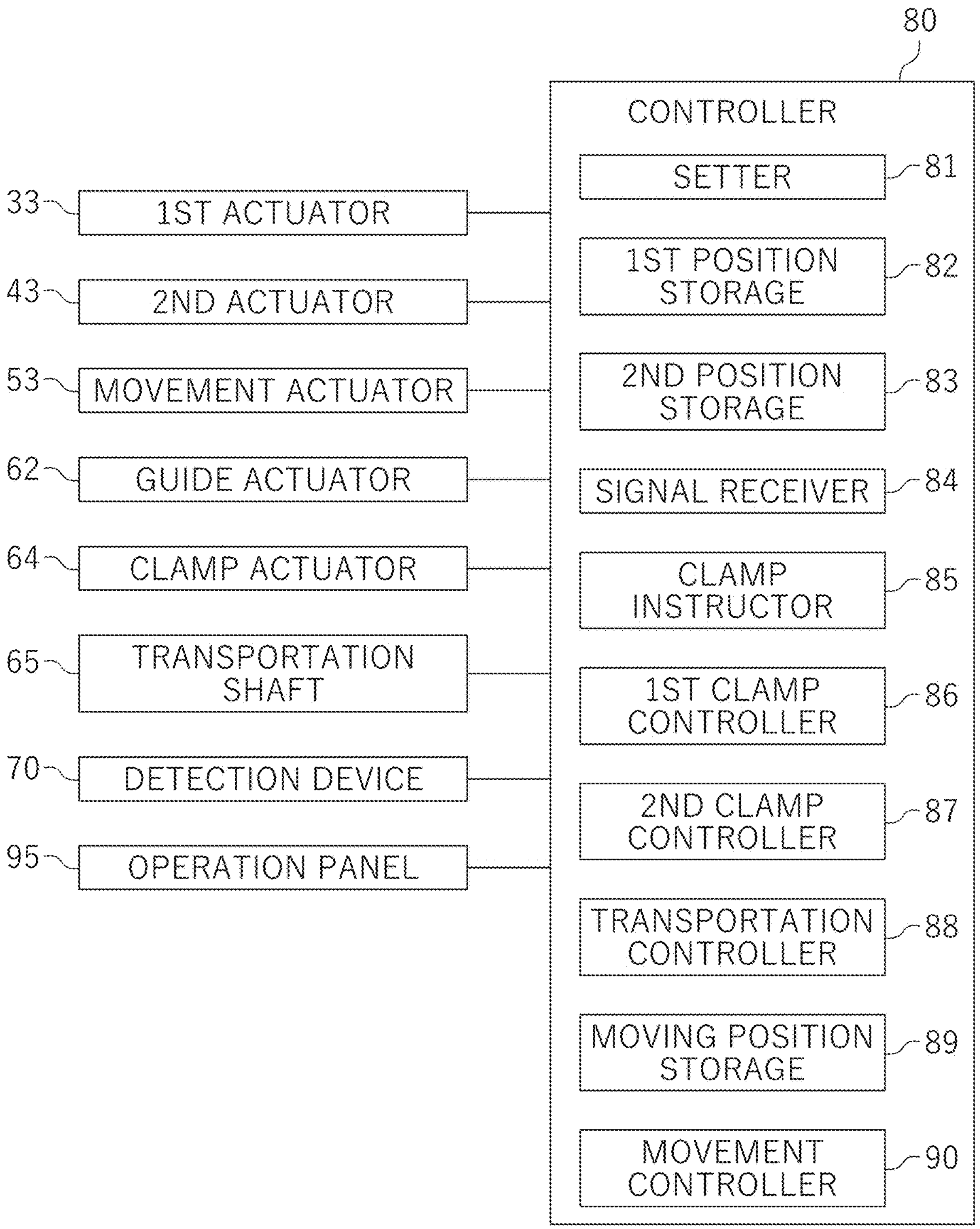
FIG. 7 a block diagram of the electric wire insertion device.

As shown in FIG. 3, the electric wire insertion device 20 includes a rubber plug holding device 30, a clamp moving device 50, an electric wire transportation device 60, a detection device 70, and a controller 80 (see FIG. 7). FIG. 4 is a perspective view of the electric wire insertion device 20. FIG. 5 is a vertical cross-sectional view of the electric wire insertion device 20. FIG. 6 is a rear view of the electric wire insertion device 20. The rubber plug holding device 30 holds the rubber plug 5 supplied by the rubber plug supply device 10. As shown in FIG. 5, the rubber plug holding device 30 includes a plurality of first clamp members 31 and a plurality of second clamp members 41. The plurality of first clamp members 31 clamp the shorter diameter portion 5*b* of the rubber plug 5. The plurality of second clamp members 41 are partially located to the front of the plurality of first clamp members 31, and clamp the long diameter portion 5*a* of the rubber plug 5.

As shown in FIG. 5 and FIG. 6, the plurality of first clamp members 31 are located around a predetermined central line CL so as to form a space S1 inner thereto, in which the cylindrical rubber plug 5 may be located. The central line CL matches the axis of the rubber plug 5 in the state where the rubber plug 5 located in the inner space S1 is clamped by the plurality of first clamp members 31. The plurality of first clamp members 31 are located along a circumferential surface of a circle centered around the central line CL. As shown in FIG. 6, the plurality of first clamp members 31 are four first clamp members 31 in this embodiment. The plurality of first clamp members 31 are located at an interval of 90 degrees. It is sufficient that there are two or more first clamp members 31, and there is no further limitation on the number of the first clamp members 31. In the case where, for example, there are three first clamp members 31, the three first clamp members 31 may be located at an interval of 120 degrees. In the case where, for example, there are six first clamp members 31, the six first clamp members 31 may be located at an interval of 60 degrees. The plurality of first clamp members 31 do not need to be located at an interval of an equal angle, and a part of, or all of, the angles between the plurality of first clamp members 31 may be different.

As shown in FIG. 6, the plurality of first clamp members 31 each include a first cylindrical portion 31*a*, a first engageable portion 31*b*, a first arm portion 31*c*, and a first tip portion 31*d*. The first cylindrical portion 31*a* is cylindrical and extends in a front-rear direction. A shaft 32*a* of a support member 32 described below is pivotably inserted into the first cylindrical portion 31*a*. The shaft 32*a* is inserted into the first cylindrical portion 31*a*, so that the first clamp member 31 is pivotable about the shaft 32*a*. The first engageable portion 31*b* is provided on an outer circumferential surface of the first cylindrical portion 31*a*. The first engageable portion 31 has gear teeth formed therein.

The first arm portion 31*c* extends from the first cylindrical portion 31*a* toward the central line CL. Hereinafter, the direction from the first cylindrical portion 31*a* toward the central line CL will be referred to also as the "inner circumferential direction", and a direction opposite thereto will be referred to also as the "outer circumferential direction". The tip portion 31*d* is provided at an inner circumferential end of the first arm portion 31*c*. As shown in FIG. 5, the tip portion 31*d* extends long in the front-rear direction. The above-described space S1, in which the rubber plug 5 is to be located, is formed inner to the plurality of tip portions 31*d*. In this embodiment, a rear end of the space S1 forms the rubber plug supply opening 21, to which the rubber plug 5 is supplied. The rubber plug supply opening 21 is in communication with the space S1, which is formed inner to the plurality of first clamp members 31. It should be noted that the rubber plug supply opening of the electric wire insertion device does not need to be defined by ends of the plurality of first clamp members 31, and may be provided separately from the above-described ends.

As shown in FIG. 6, the tip portion 31*d* has a first inner side surface 31*e* facing the space S1 inner to the plurality of first clamp members 31. The first inner side surface 31*e* is provided so as to face the central line CL. As shown in FIG. 6, the first inner side surface 31*e* is structured such that different regions thereof along a circumferential direction of the shaft 32*a* have different distances from the shaft 32*a*. The first inner side surface 31*e* is non-arcked, or arcked as centered about a position different from the shaft 32*a*, as seen in the front-rear direction. The first inner side surface 31*e* includes a first rubber plug contact portion 31*e*1, which is to be in contact with an outer circumferential surface of the rubber plug 5. The first rubber plug contact portion 31*e*1 faces the space S1 inner to the plurality of first clamp members 31. Therefore, the pivoting of the first clamp member 31 about the shaft 32*a* causes the first rubber plug contact portion 31*e*1 to get closer to, or farther from, the central line CL.

As shown in FIG. 5 and FIG. 6, the rubber plug holding device 30 includes the support member 32, a first actuator 33, a first pulley 34, and a first belt 35. The support member 32 supports the plurality of first clamp members 31. The support member 32 includes a plurality of the shafts 32*a* each extending parallel to the central line CL. As described above, the plurality of shafts 32*a* are respectively inserted into the cylindrical portions 31*a* of the first clamp members 31. The plurality of shafts 32*a* respectively support the first clamp members 31 such that the first clamp members 31 are pivotable.

The first actuator 33 drives the plurality of first clamp members 31 via the first pulley 34 and the first belt 35. The first actuator 33 is a stepping motor in this embodiment. The first actuator 33 includes a driving shaft 33*a* rotatable about the front-rear direction acting as an axial direction thereof. A first motor pulley 33*b* is secured to the driving shaft 33*a*. The first belt 35, which is endless, is wound around the first motor pulley 33*b*. In this embodiment, the first belt 35 is a timing belt having a groove, engageable with a gear of the pulley, formed therein.

The first pulley 34 includes an annular ring portion 34*a*, around which the first belt 35 is to be wound. The first ring portion 34*a* has a rotation center matching the central line CL. The first pulley 34 is rotated about the central line CL. The first ring portion 34*a* includes an outer gear 34*a*1 in an outer circumferential surface thereof, and an inner gear 34*a*2 in an inner circumferential surface thereof. The first belt 35 is in engagement with the outer gear 34*a*1 of the first pulley 34. The first belt 35 is also in engagement with the driving shaft 33*a* of the first actuator 33 via the first motor pulley 33*b*. The first belt 35 and the first motor pulley 33*b* act as an example of transfer mechanism that transfers the rotation of the driving shaft 33*a* to the first pulley 34. It should be noted that the transfer mechanism that transfers the rotation of the driving shaft 33*a* to the first pulley 34 is not limited to a belt and a pulley. When the driving shaft 33*a* is rotated by a certain rotation angle, the first pulley 34 is rotated by an angle corresponding to the rotation angle.

As shown in FIG. 6, the first engageable portion 31*b* of the first clamp member 31 is located inner to the first ring portion 34*a* in a radial direction. The first engageable portion 31*b* includes gear teeth, and is in engagement with the inner gear 34*a*2 of the first ring portion 34*a*. With this structure, the rotation of the first pulley 34 causes the first clamp members 31 to pivot about the shafts 34*a*. When the driving shaft 33*a* of the first actuator 33 is rotated by a certain rotation angle, the first clamp members 31 are pivoted about the shafts 32*a* by an angle corresponding to the rotation angle of the driving shaft 33*a* via the first motor pulley 33*b*, the first belt 35 and the first pulley 34. As can be seen, in the case where the first pulley 34 including the outer gear 34*a*1 receiving the rotation force of the first actuator 33 and the inner gear 34*a*2 transferring the rotation force of the first actuator 33 to the first clamp members 31 is used, the first clamp members 31 are pivoted with a simple structure. With such a structure, first clamp members 31 are located inner to the first ring portion 34*a* in the radial direction. Therefore, the entirety of the mechanism driving the first clamp members 31 by the first actuator 33 is made compact.

In this embodiment, the first rubber plug contact portion 31*e*1 is provided at each first inner side surface 31*e* of the first clamp member 31, and different regions of the first inner side surface 31*e* along the circumferential direction of the shaft 32*a* have different distances from the shaft 32*a* as the pivoting center of the first inner side surface 31*e*. Therefore, mere pivoting of the first clamp members 31 causes the first rubber plug contact portions 31*e*1 to get closer to, or farther from, the central line CL. With such a structure, the rubber plug holding device 30 according to this embodiment is simple and compact.

A plurality of second clamp members 41 and a mechanism that drives the plurality of second clamp members 41 are structured in substantially the same manner as the plurality of first clamp members 31 and the mechanism that drives the plurality of first clamp members 31. The plurality of second clamp members 41 are located side by side with the plurality of first clamp members 31 in a direction in which the central line CL extends. In this embodiment, the positions of the plurality of second clamp members 41 in the front-rear direction partially overlap the positions of the plurality of first clamp members 31 in the front-rear direction.

In this embodiment, the shafts 32*a* of the support member 32 extend parallel to the central line CL. The shafts 32*a* of the support member 32 also supports the second clamp members 41 such that the second clamp members 41 are pivotable. In this embodiment, the first clamp members 31 and the second clamp members 41 share the support members (in this embodiment, the shafts 32*a*) to decrease the number of components. It should be noted that the rubber plug holding device may include a second support members supporting the second clamp members in addition to the support members supporting the first clamp members.

As shown in FIG. 4, there are four second clamp members 41 in this embodiment. It should be noted that there is no limitation on the number of the second clamp members 41. As shown in FIG. 5, second arm portions 41*c* of the second clamp members 41 are located outer in the circumferential direction to the first tip portions 31*d*, of the first clamp members 31, extending in the front-rear direction. The second arm portions 41*c* extend forward. Tip portions 41*d* connected to front ends of the second arm portions 41*c* are located to the front of front ends of the first clamp members 31. The tip portions 41*d* each include a second rubber plug contact portion 41*e*1, which is to be in contact with the long diameter portion 5*a* of the rubber plug 5. The second rubber plug contact portion 41*e*1 is located at a position different from that of the first rubber plug contact portion 31*e*1 (see FIG. 6) in the direction in which the central line CL extends. In more detail, the plurality of second rubber plug contact portions 41*e*1 are provided to the front of the plurality of first rubber plug contact portions 31*e*1. The plurality of second rubber plug contact portions 41*e*1 are structured so as to be in contact with the long diameter portion 5*a* of the rubber plug 5.

In this embodiment, the second clamp members 41 including the second rubber plug contact portions 41*e*1 are only partially located at positions shifted from the positions of the first clamp members 31. Alternatively, the second clamp members 41 may be entirely located at positions shifted from the positions of the first clamp members 31.

As shown in FIG. 5, like the plurality of first clamp members 31, the plurality of second clamp members 41 are located around the central line CL so as to form a space S2 inner thereto, in which the cylindrical rubber plug 5 may be located. A second actuator 43 pivots the second clamp members 41 via a second motor pulley 43*b*, a second belt 45, and a second pulley 44. The second actuator 43 is also a stepping motor in this embodiment. The second actuator 43, the second motor pulley 43*b*, the second pulley 44 and the second belt 45 are respectively structured in substantially the same manner as the first actuator 33, the first motor pulley 33*b*, the first pulley 34 and the first belt 35, Rotation of a driving shaft 43*a* of the second actuator 43 causes the second clamp members 41 to pivot about the shafts 32*a*. An inner side surface of each of the second clamp members 41 is structured such that different regions of the inner side surface along the circumferential direction of the shaft 32*a* have different distances from the shaft 32*a*. Therefore, the pivoting of the second clamp members 41 about the shafts 32*a* causes the second rubber plug contact portions 41*e*1 provided at the inner side surfaces of the second clamp members 41 to get closer to, or farther from, the central line CL.

As shown in FIG. 4 and FIG. 5, the clamp moving device 50 supports the rubber plug holding device 30 from below. The clamp moving device 50 moves the rubber plug holding device 30 parallel to the central line CL (in this embodiment, in the front-rear direction). The clamp moving device 50 includes a base plate 51, a pair of guide rails 52, and a movement actuator 53 (see FIG. 7). The base plate 51 supports the rubber plug holding device 30. The pair of guide rails 52 extend in the front-rear direction. The base plate 51 are in engagement with the pair of guide rails 52 so as to be slidable therewith in the front-rear direction. The movement actuator 53 moves the base plate 51 along the pair of guide rails 52. There is no specific limitation on the type of the movement actuator 53. In this embodiment, the movement actuator 53 is a stepping motor. In this embodiment, the clamp moving device 50 is capable of moving the rubber plug holding device 30 by 10 mm in the front-rear direction. It should be noted that there is no limitation on the distance by which the clamp moving device 50 is capable of moving the rubber plug holding device 30.

The electric wire transportation device 60 transports the electric wire 6 along the central line CL. Before the electric wire 6 is inserted into the rubber plug 5, the electric wire transportation device 60 transports the electric wire 6 from the front side to the rear side with respect to the rubber plug holding device 30. After the electric wire 6 is inserted into the rubber plug 5, the electric wire transportation device 60 transports the electric wire 6 forward to separate the electric wire 6 from the rubber plug holding device 30. As shown in FIG. 4, the electric wire transportation device 60 includes an electric wire guide 61 guiding the electric wire 6. The electric wire guide 61 is provided to the front of the rubber plug holding device 30. The electric wire guide 61 includes a top member 61U and a bottom member 61D. The top member 61U and the bottom member 61D are flat plate-like. The top member 61U and the bottom member 61D are structured such that one thereof or both thereof are movable in the up-down direction. The electric wire transportation device 60 includes a guide actuator 62 (see FIG. 7) moving one of, or both of, the top member 61U and the bottom member 61D in the up-down direction.

An electric wire insertion hole 61*a* (also see FIG. 3) is formed by the top member 61U and the bottom member 61D at an interface at which the top member 61U and the bottom member 61D contact each other. The electric wire insertion hole 61*a* is located on the central line CL. The movement of one of, or both of, the top member 61U and the bottom member 61D in the up-down direction allows the electric wire insertion hole 61*a* to have a size corresponding to any of various diameters of the electric wire 6. Hereinafter, decrease in the distance between the top member 61U and the bottom member 61D will be referred to also as "closing the electric wire guide 61", and increase in the distance between the top member 61U and the bottom member 61D will be referred to also as "opening the electric wire guide 61". The electric wire 6 is inserted into the electric wire insertion hole 61*a* to be transported along the central line CL. The electric wire transportation device 60 includes an electric wire clamp 63 and a transportation shaft 65 (see FIG. 7; not shown in any of FIG. 3 through FIG. 6). The electric wire 6 is transported by a rotation of the transportation shaft 65.

The electric wire clamp 63 is located along the central line CL on the rubber plug holding device 30 side with respect to the transportation shaft 65. The electric wire clamp 63 is located between the transportation shaft 65 and the electric wire guide 61. In this embodiment, the electric wire clamp 63 includes a pair of holding members 63U and 63D facing each other in the up-down direction. The electric wire transportation device 60 includes a clamp actuator 64 (see FIG. 7) moving the pair of holding members 63U and 63D in the up-down direction to open and close the electric wire clamp 63. When the electric wire clamp 63 is closed, the electric wire 6 is grasped. When the electric wire clamp 63 is opened, the electric wire 6 is released from the grasped state. It should be noted that the electric wire clamp 63 merely needs to grasp and release the electric wire 6, and there is no limitation on the structure thereof. The electric wire clamp 63 is supported by a moving device (not shown) moving the electric wire clamp 63 in the front-rear direction.

As shown in FIG. 5, the electric wire transportation device 60 includes a wall 61*b* (also see FIG. 3), against which a front end, in the advancing direction, of the rubber plug 5 supplied is to collide. The wall 61*b* is provided such that the rubber plug 5 stops at a predetermined position, along the central line CL, at which the first clamp members 31 and the second clamp members 41 are capable of grasping the rubber plug 5. The wall 61*b* is located to the front of the first rubber plug contact portions 31*e*1 and the second rubber plug contact portions 41*e*1 in the advancing direction of the rubber plug 5. In this embodiment, the wall 61*b* is a rear end surface of the flat plate-like electric wire guide 61. It should be noted that the wall against which the rubber plug 5 is to collide may be provided separately from the electric wire guide. Hereinafter, the predetermined position of the rubber plug 5 will be referred to also as the "clamp position" of the rubber plug 5.

The detection device 70 detects whether or not the rubber plug 5 is at the clamp position. There is no specific limitation on the structure of the detection device 70. In this embodiment, the detection device 70 includes an optical sensor. As shown in FIG. 3, the detection device 70 includes a light projector 71 and a light receiver 72. The light projector 71 is located above a gap between the rubber plug holding device 30 and the wall 61*b* of the electric wire guide 61. The light projector 71 radiates light toward the gap. In FIG. 3, letter Ax refers to an optical axis of the light to be radiated by the light projector 71. The light receiver 72 is located below the gap between the rubber plug holding device 30 and the wall 61*b* of the electric wire guide 61. The light receiver 72 is located on the optical axis Ax of the light to be radiated by the light projector 71. The positions of the light projector 71 and the light receiver 72 may be opposite to those described above. Alternatively, the light projector 71 and the light receiver 72 may face each other in any of different directions around the central line CL, for example, in a left-right direction.

In the state where the rubber plug 5 is not at the clamp position, the light receiver 72 receives the light radiated by the light projector 71. In the state where the rubber plug 5 is at the clamp position, the light radiated by the light projector 71 is blocked by the rubber plug 5 and does not reach the light receiver 72. Whether or not the rubber plug 5 is at the clamp position is determined based on whether or not the light receiver 72 receives the light from the light projector 71. The detection device 70 sends a signal indicating whether or not the rubber plug 5 is at the clamp position to the controller 80.

The electric wire insertion device 20 includes the controller 80 controlling operations of various components. FIG. 7 is a block diagram of the electric wire insertion device 20. As shown in FIG. 7, the controller 80 is connected with the first actuator 33, the second actuator 43, the movement actuator 53, the guide actuator 62, the clamp actuator 64 and the transportation shaft 65, and controls the operations thereof. The controller 80 is also connected with the detection device 70, and receives a signal from the detection device 70. The controller 80 is further connected with an operation panel 95, by which a user makes various settings. The controller 80 and the rubber plug supply device 10 may or may not be connected with each other.

There is no specific limitation on the structure of the controller 80. The controller 80 may include, for example, a central processing unit (hereinafter, referred to as the "CPU"), a ROM storing, for example, a program to be executed by the CPU, a RAM, and the like. Each of the portions of the controller 80 may be realized by software or hardware. Each of the portions may be a processor or a circuit. As shown in FIG. 7, the controller 80 includes a setter 81, a first position storage 82, a second position storage 83, a signal receiver 84, a clamp instructor 85, a first clamp controller 86, a second clamp controller 87, a transportation controller 88, a moving position storage 89, and a movement controller 90. The controller 80 may include further processors, which are not shown or described herein.

The setter 81 sets the type of the rubber plug 5 to be supplied. In this embodiment, the electric wire insertion device 20 is supplied with various types of rubber plugs 5 having different shapes and various types of electric wires 6 having different diameters in correspondence with the rubber plugs 5. The diameters of the long diameter portion 5*a* and the short diameter portion 5*b* vary in accordance with the type of the rubber plug 5. The setting of the type of the rubber plug 5 by the setter 81 may be performed automatically based on information from an upper-level system connected with the electric wire insertion device 20 or may be performed by the user.

The first position storage 82 stores the position of the first actuator 33 in correspondence with each type of the rubber plug 5. It should be noted that data to be stored on the first position storage 82 merely needs to correspond to the positions of the first rubber plug contact portions 31*e*1 with respect to the central line CL, and merely needs to be a physical amount equivalent to the positions of the first rubber plug contact portions 31*e*1 with respect to the central line CL. In this embodiment, the first position storage 82 stores a rotation position of the first actuator 33. Such a stored position of the first actuator 33 corresponds to the diameter of the short diameter portion 5*b* of the rubber plug 5.

The first position storage 82 also stores a position of the first actuator 33 before the electric wire 6 is inserted into the rubber plug 5 (hereinafter, referred to as the "pre-insertion position") and a position of the first actuator 33 after the electric wire 6 is inserted into the rubber plug 5 (hereinafter, referred to as the "post-insertion position") in correspondence with each type of the rubber plug 5. When the electric wire 6 is inserted, the diameter of the rubber plug 5 is generally increased. Therefore, in order to insert the electric wire 6 smoothly into the rubber plug 5, the post-insertion positions of the first rubber plug contact portions 31*e*1 are set. The first rubber plug contact portions 31*e*1 at the post-insertion positions are farther from the central line CL than the first rubber plug contact portions 31*e*1 at the pre-insertion positions.

The second position storage 83 stores similar data on the second clamp member 41 as stored on the first position storage 82. The second position storage 83 stores a pre-insertion position and a post-insertion position of the second actuator 43 in correspondence with each type of the rubber plug 5.

The signal receiver 84 receives a signal from the detection device 70. When the detection device 70 detects that the rubber plug 5 is at the clamp position, the clamp instructor 85 causes the first actuator 33 and the second actuator 43 to operate such that the first rubber plug contact portions 31*e*1 and the second rubber plug contact portions 41*e*1 get closer to the central line CL. This operation may be performed immediately after the detection device 70 detects that the rubber plug 5 is at the clamp position, or may be performed after an elapse of a time period for confirmation.

The first clamp controller 86 controls the first actuator 33 based on the setting by the setter 81 and the pre-insertion position and the post-insertion position stored on the first position storage 82 to control the positions of the first rubber plug contact portions 31*e*1 with respect to the central line CL. Similarly, the second clamp controller 87 controls the second actuator 43 based on the setting by the setter 81 and the pre-insertion position and the post-insertion position stored on the second position storage 83 to control the positions of the second rubber plug contact portions 41*e*1 with respect to the central line CL.

The transportation controller 88 controls the electric wire transportation device 60 to transport the electric wire 6 from an area outside the rubber plug holding device 30 toward the space S1 formed inner to the plurality of first clamp members 31 and the space S2 formed inner to the plurality of second clamp members 41. As a result, the electric wire 6 is inserted into the rubber plug 5. After the electric wire 6 is inserted into the rubber plug 5, the transportation controller 88 controls the electric wire transportation device 60 to move the electric wire 6 inserted into the rubber plug 5 forward (direction in which the electric wire 6 is separated from the rubber plug holding device 30).

The moving position storage 89 stores the position, in the front-rear direction, at which the rubber plug holding device 30 is to be located by the clamp moving device 50. The moving position storage 89 stores an initial position, at which the rubber plug holding device 30 is to be located before the electric wire 6 is inserted, in correspondence with each type of the rubber plug 5. The moving position storage 89 stores the position to which the rubber plug holding device 30 is to move in the transportation direction of the rubber plug 5 after the electric wire 6 starts inserted into the rubber plug 5, and the position to which the rubber plug holding device 30 is to move in the direction opposite to the transportation direction of the rubber plug 5 after that, in correspondence with each type of the rubber plug 5 or each type of the electric wire 6. It should be noted that these positions may be fixed regardless of the type of the rubber plug 5 or the type of the electric wire 6. The fixed positions may be, for example, front and rear stroke ends of the clamp moving device 50.

The movement controller 90 controls the operation of the clamp moving device 50. In more detail, the movement controller 90 controls the clamp moving device 50 to locate the rubber plug holding device 30 at the initial position defined for each type of the rubber plug 5. After the electric wire 6 starts inserted into the rubber plug 5 by the electric wire transportation device 60, the movement controller 90 controls the clamp moving device 50 to move the rubber plug holding device 30 in the transportation direction of the electric wire 6. After the rubber plug holding device 30 is moved in the transportation direction of the electric wire 6, the movement controller 90 controls the clamp moving device 50 to move the rubber plug holding device 30 in the direction opposite to the transportation direction of the electric wire 6. The positions, in the front-rear direction, to which the rubber plug holding device 30 is to be moved by these operations are based on the positions stored on the moving position storage 89. These operations will be described below.

Figure 8:
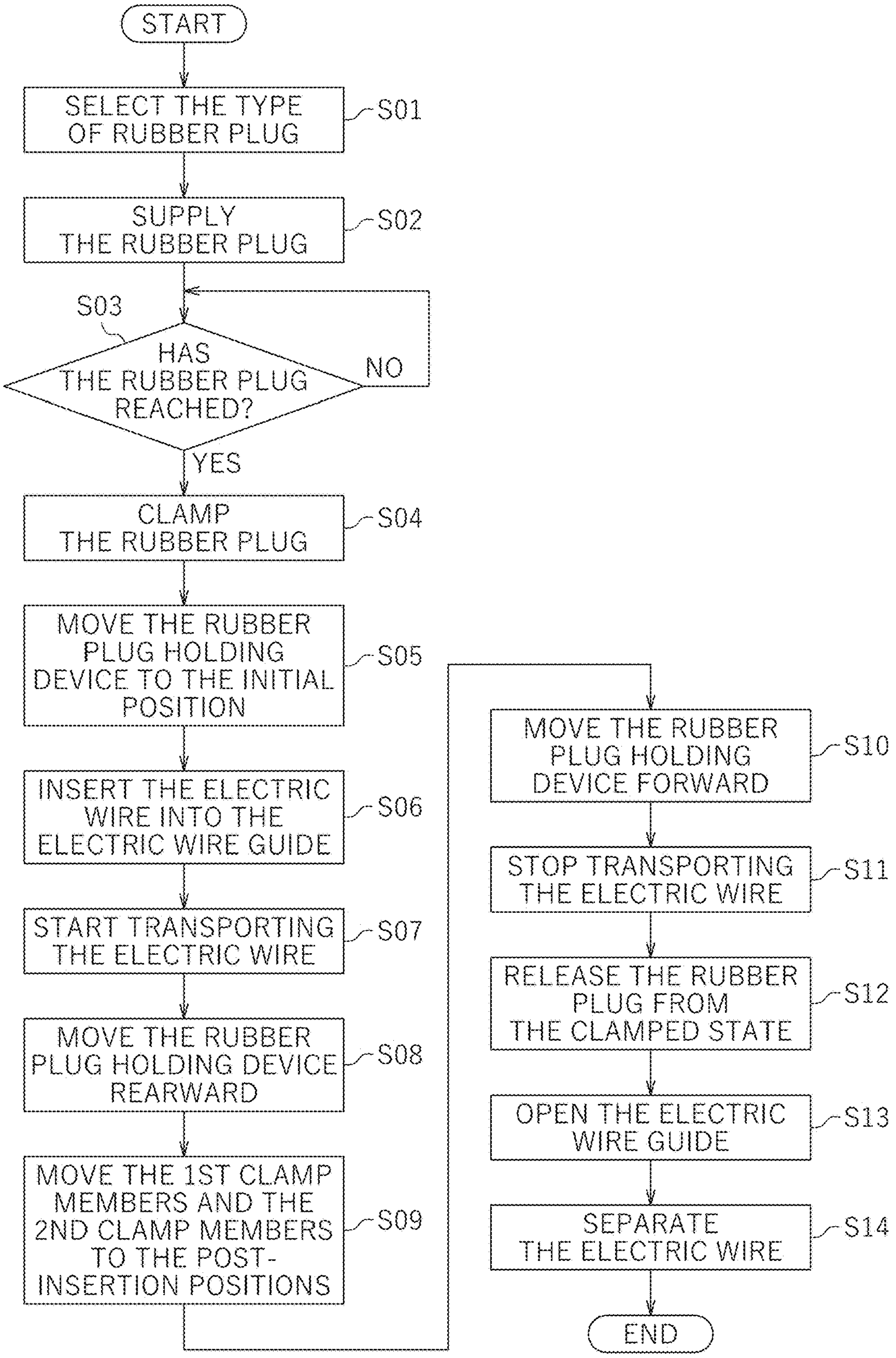
FIG. 8 is a flowchart showing a process of inserting an electric wire into the rubber plug.

Hereinafter, a process of inserting the electric wire 6 into the rubber plug 5 will be described. FIG. 8 is a flowchart showing a process of inserting the electric wire 6 into the rubber plug 5. As shown in FIG. 8, in step S01 of the process of inserting the electric wire 6 into the rubber plug 5, the type of the rubber plug 5 is selected.

In step S02, the rubber plug supply device 10 supplies the rubber plug 5 to the electric wire insertion device 20. As a result of step S02, the rubber plug 5 is moved forward until colliding against the wall 61*b* of the electric wire guide 61. The position of the rubber plug 5 when the rubber plug 5 collides against the wall 61*b* of the electric wire guide 61 is the clamp position. The rubber plug 5 is caused to collide against the wall 61*b* to stop at the clamp position certainly. Then, in step S03, whether or not the rubber plug 5 has reached the clamp position is determined based on the signal from the detection device 70. In the case where the rubber plug 5 has not reached the clamp position (NO in step S03), the process returns to step S03, where the determination is repeated. In the case where the rubber plug 5 has reached the clamp position (YES in step S03), the rubber plug 5 is clamped in step S04. As can be seen, in this embodiment, after being confirmed to have reached the clamp position, the rubber plug 5 is clamped. Therefore, the rubber plug 5 is held more certainly.

For clamping the rubber plug 5, the driving shaft 33*a* of the first actuator 33 is rotated by the rotation angle stored on the first position storage 82. As a result, the first clamp members 31 are pivoted in a direction of arrow R1 in FIG. 6. When the first clamp members 31 are pivoted in the R1 direction, as shown in FIG. 6, the first rubber plug contact portions 31*e*1 are moved in a direction of arrow R2 to get closer to the central line CL. When the driving shaft 33*a* of the first actuator 33 is rotated by the rotation angle stored on the first position storage 82, the first rubber plug contact portions 31*e*1 reach the pre-insertion positions. As a result, the short diameter portion 5*b* of the rubber plug 5 is held by the plurality of first clamp members 31. As can be seen, the first clamp members 31 are driven so as to cause the first rubber plug contact portions 31*e*1 to get closer to the central line CL, so that the rubber plug 5 of any type having any of various outer diameters is held. In more detail, the type of the rubber plug 5 is set in step S01 and the position of the first actuator 33 is controlled in accordance with the type of the rubber plug 5 in step 04, so that the rubber plug 5 of any type having any of various outer dimeters is held.

Similarly, the large diameter portion 5*a* of the rubber plug 5 is held by the plurality of second clamp members 41. The plurality of second clamp members 41 allow the rubber plug 5 to be held in a preferred manner even though the rubber plug 5 is stepped. It should be noted that even in the case where the rubber plug 5 is not stepped, the rubber plug 5 is held by the rubber plug holding device 30 including the second clamp members 41, needless to say.

In step S05, the rubber plug holding device 30 is moved by the clamp moving device 50 to the initial position stored on the moving position storage 89. The rubber plug holding device 30 is movable parallel to the central line CL, and therefore, the rubber plug 5 is located at a position suitable for the insertion of the electric wire 6. The initial position may be, for example, a position at which the rubber plug 5 is close to, or contacts, the electric wire guide 61.

In step S06, the electric wire transportation device 60 is driven to insert the electric wire 6 into the electric wire insertion hole 61*a* of the electric wire guide 61. At this point, the top member 61U or the bottom member 61D may be moved to open the electric wire guide 61. After that, the electric wire guide 61 may be closed. The operation in step S02 through S05 and the operation in step S06 may be performed in an opposite order or at the same time.

In step S07, the electric wire 6 starts transported rearward by the electric wire transportation device 60. The electric wire 6 is guided by the electric wire guide 61 to be inserted into the through-hole 5*c* of the rubber plug 5. When a predetermined time period elapses after step S07, the rubber plug holding device 30 is moved rearward by the clamp moving device 50 in step S08. At this point, the electric wire clamp 63 is also moved rearward by a moving device (not shown). During these operations, the rearward transportation of the electric wire 6 is continued. As a result of the rearward movement of the rubber plug 5 and the rearward movement of the electric wire clamp 63, the position of the electric wire guide 61 guiding the electric wire 6 is relatively moved from the vicinity of the rubber plug 5 toward a middle position between the electric wire clamp 63 and the rubber plug 5. Therefore, the distance between the electric wire clamp 63 and the electric wire guide 61 is shortened. Along with this, the length of a portion of the electric wire 6 that is between the electric wire clamp 63 and the electric wire guide 61 (free electric wire length) is shortened. When the free electric wire length of the electric wire 6 is shortened, the buckling tolerance of the electric wire 6 is improved. As a result, the buckling of the electric wire 6 is suppressed.

When a predetermined time period elapses after step S08, the first clamp members 31 and the second clamp members 41 are moved to the post-insertion positions in step S09. This weakens the clamp on the rubber plug 5 by the rubber plug holding device 30 to permit the rubber plug 5 to expand outward in the circumferential direction. As a result, the electric wire 6 is inserted into the through-hole 5*c* smoothly.

The above-described control suppresses rattling of the rubber plug 5 in the held state. With a conventional rubber plug insertion device for which a rubber plug holding member is prepared for each type of the rubber plug, the size of the rubber plug holding member needs to be set to be larger in consideration that the outer size of the rubber plug is increased by the insertion of the electric wire. Therefore, with the conventional rubber plug insertion device, the rubber plug rattles significantly before the electric wire is inserted. With the rubber plug holding device 30 according to this embodiment, the pre-insertion positions of the first rubber plug contact portions 31*e*1 are set independently from the post-insertion positions thereof. This suppresses the rattling of the rubber plug 5 before the electric wire 6 is inserted. Therefore, the electric wire 6 is inserted into the rubber plug 5 more certainly. This is applicable to the second clamp members 41.

In step S10, the rubber plug holding device 30 is moved forward by the clamp moving device 50. As a result of the forward movement of the rubber plug holding device 30 and the continuing rearward movement of the electric wire 6, the electric wire 6 is inserted into the rubber plug 5 completely. The operations in steps S08 through S10 may be performed in a different order except that the operation in step S10 needs to be performed after the operation in step S08.

In step S11, the rearward transportation of the electric wire 6 is stopped. In step S12, the rubber plug holding device 30 is driven to be opened, and the rubber plug 5 is released from the held state. In step S13, the electric wire guide 61 is opened. As a result, the electric wire 6 having the rubber plug 5 attached thereto is released from the held state. The operation in step S12 and the operation in S13 may be performed in an opposite order or at the same time.

In step S14, the electric wire 6 having the rubber plug 5 attached thereto is transported forward by the electric wire transportation device 60. Thus, the process of inserting the electric wire 6 into the rubber plug 5 is finished. The above-described process is a preferred example, and the process of inserting the electric wire 6 into the rubber plug 5 is not limited to this.

An embodiment of the present invention is described above. The above-described embodiment is merely an example. Various other embodiments are available. Hereinafter, such other embodiments will be described briefly.

First Modification

Figure 9:
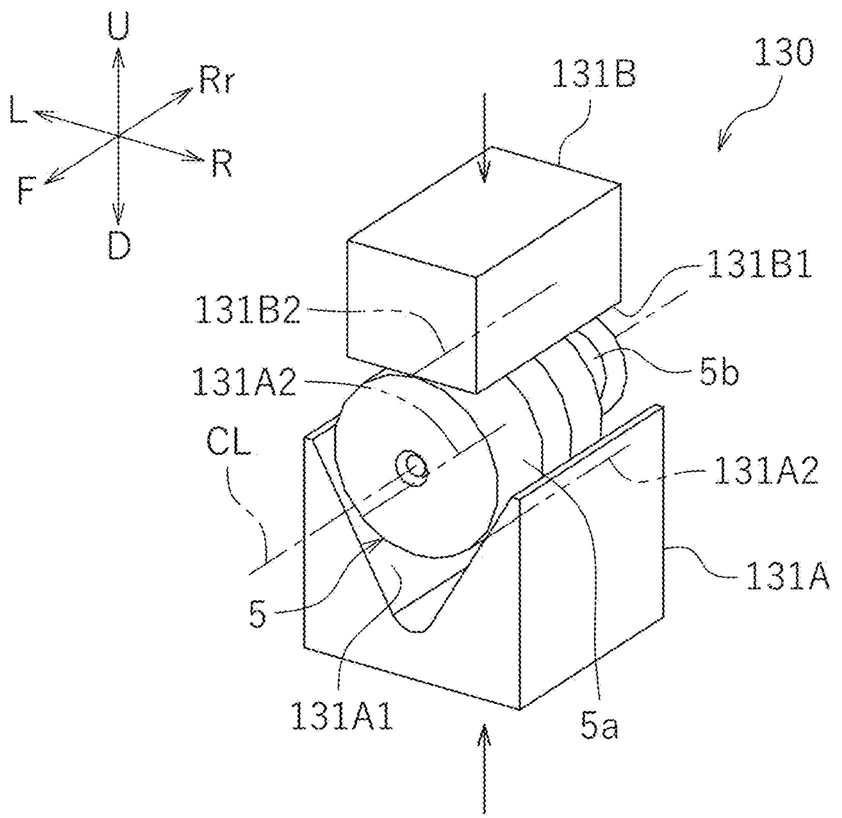
FIG. 9 is a perspective view of a main part of a rubber plug holding device according to a first modification.

FIG. 9 is a perspective view of a main part of the rubber plug holding device 130 according to a first modification. FIG. 9 does not show a part of the components. As shown in FIG. 9, the rubber plug holding device 130 according to this modification includes two first clamp members 131A and 131B (hereinafter, referred to simply as the "clamp members"; this is applicable to a second modification). The two clamp members 131A and 131B face each other in the up-down direction in this embodiment. It should be noted that the direction in which the two clamp members 131A and 131B face each other is not limited to the up-down direction.

Although not shown, the rubber plug holding device 130 includes an actuator moving the clamp members 131A and 131B in the up-down direction. When the actuator moves the bottom clamp member 131A upward and the top clamp member 131B downward, the clamp members 131A and 131B clamp the rubber plug 5.

As shown in FIG. 9, the clamp member 131A has an inner side surface 131A1 having a V shape as seen in the front-rear direction. In the state of being held by the rubber plug holding device 130, the rubber plug 5 is in contact with, and supported by, two rubber plug contact portions 131A2 of the inner side surface 131A1. The two rubber plug contact portions 131A2 are located in two inclining surfaces of the inner side surface 131A1 having the V shape as seen in the front-rear direction, and extend in the front-rear direction.

A bottom surface 131B1 of the clamp member 131B is flat. Therefore, in the state of being held by the rubber plug holding device 130, the rubber plug 5 is in contact with a single rubber plug contact portion 131B2 of the bottom surface 131B1. The rubber plug contact portion 131B2 extends in the front-rear direction.

The rubber plug holding device 130 according to this modification also holds the rubber plug 5 with the axis of the rubber plug 5 matching a predetermined central line CL set in the rubber plug holding device 130. In other words, as long as including three or more rubber plug contact portions to be in contact with the outer circumferential surface of the cylindrical rubber plug 5, the rubber plug holding device holds the rubber plug 5 in a preferred manner by two clamp members. In this embodiment, the three or more rubber plug contact portions are the two rubber plug contact portions 131A2 of the clamp member 131A and the single rubber plug contact portion 131B2 of the clamp member 131B. Although not shown, a plurality of second clamp members may have substantially the same structure.

Second Modification

Figure 10:
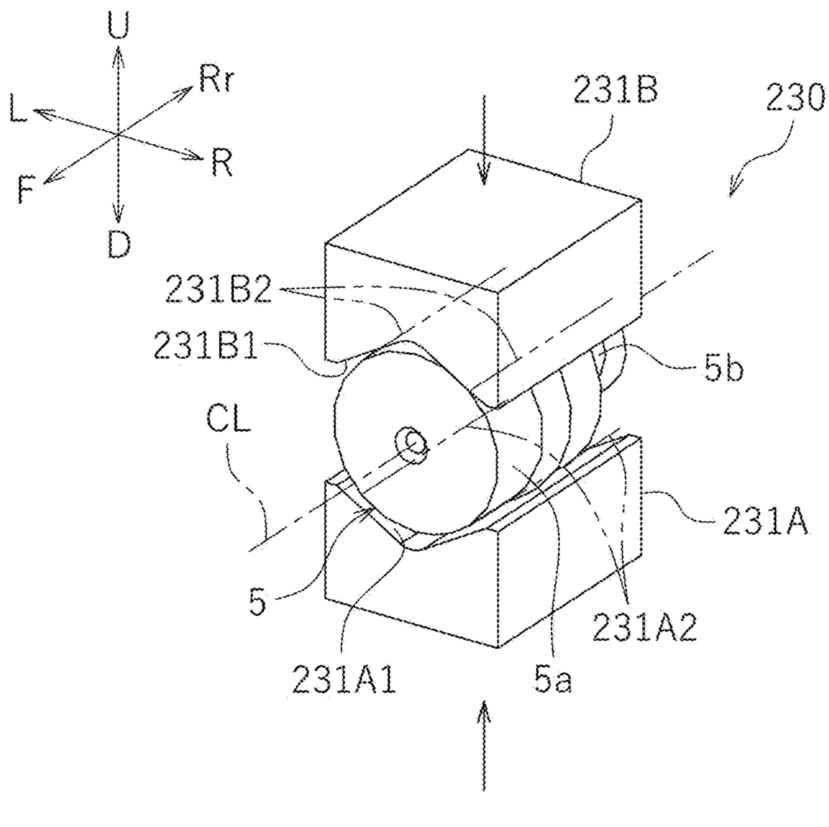
FIG. 10 is a perspective view of a main part of a rubber plug holding device according to a second modification.

The first modification may be carried out in a further modified form. FIG. 10 is a perspective view of a main part of a rubber plug holding device 230 according to the second modification. Like FIG. 9, FIG. 10 does not show a part of the components. As shown in FIG. 10, the rubber plug holding device 230 according to this modification includes two clamp members 231A and 231B. The two clamp members 231A and 231B face each other in the up-down direction.

As shown in FIG. 10, the clamp member 231A has an inner side surface 231A1 having a V shape as seen in the front-rear direction. In the state of being held by the rubber plug holding device 130, the rubber plug 5 is in contact with, and supported by, two rubber plug contact portions 231A2 of the inner side surface 231A1.

In this modification, the top clamp member 231B is identical to the bottom clamp member 231A. The top clamp member 231B is located at a position rotated by 180 degrees from the bottom clamp member 231A about the central line CL. The V-shaped inner side surface 231A1 of the clamp member 231A and a V-shaped inner side surface 231B1 of the clamp member 231B face each other. In the state of being held by the rubber plug holding device 230, the rubber plug 5 is in contact with two rubber plug contact portions 231B2 of the inner side surface 231B1.

As described above, the rubber plug holding device 230 according to this modification includes the two clamp members 231A and 231B each including two rubber plug contact portions to be in contact with the cylindrical rubber plug 5. In this embodiment, the two clamp members 231A and 231B respectively have the two rubber plug contact portions 231A2 and the two rubber plug contact portions 231B2. The rubber plug holding device 230 having such a structure also holds the rubber plug 5 with the axis of the rubber plug 5 matching a predetermined central line CL set in the rubber plug holding device 230. Such a structure allows the axis of the rubber plug 5 to match the central line CL by simpler control than with the rubber plug holding device 130 according to the first modification. Although not shown, a plurality of second clamp members may have substantially the same structure.

As described in the first modification and the second modification, the plurality of first clamp members may have the same shape as each other, or may have different shapes from each other. The plurality of clamp members are not limited to having any specific shape as long as having a total of three or more rubber plug contact portions to be in contact with the rubber plug. This is applicable to the plurality of second clamp members.

Other Modifications

The above-described embodiment does not limit the present invention unless otherwise specified. For example, in another preferred embodiment, the number of the first clamp members may be three. Alternatively, the number of the first clamp members may be five or more. It is preferred that the first clamp members are provided in the number of three or more. In the case where the number of the first clamp members is three or more, the first clamp members get closer to the rubber plug 5 in at least three directions set along the circumferential direction. Therefore, the rubber plug 5 is held stably. This is applicable to the plurality of second clamp members.

In the above-described embodiment, the rubber plug holding device 30 includes the plurality of first clamp members 31 and the plurality of second clamp members 41. The rubber plug holding device does not need to include the second clamp members. Alternatively, the rubber plug holding device may further include a plurality of third clamp members or a plurality of fourth clamp members (or a plurality of further clamp members).

In the above-described embodiment, the mechanism that receives a driving force of the first actuator 33 to drive the first clamp members 31 such that the rubber plug contact portions **31*e*1 get closer to, or farther from, the central line CL at the same time is the first pulley 34 including the inner gear 34*a*2. The mechanism that drives the plurality of first clamp members in a synchronized state is not limited to such a mechanism. For example, the mechanism that drives the plurality of first clamp members in a synchronized state may include a plurality of gears that are each coupled with one first clamp member and are engaged with each other. This is applicable to the second clamp members 41**.

In the above-described embodiment, the first rubber plug contact portions **31*e*1 get closer to, or farther from, the central line CL by an action of the first inner side surfaces 31*e*, different regions of which have different distances from the pivoting axis. The mechanism that causes the first rubber plug contact portions 31*e*1 to get closer to, or farther from, the central line CL is not limited to such a mechanism. For example, the first clamp members may get closer to, or farther from, the central line along a direction normal to the circumferential direction. This is applicable to the second clamp members 41**.

In the above-described embodiment, the first actuator 33 is a stepping motor, the rotation position of which is recognizable. The first actuator 33 is not limited to this. The first actuator may be, for example, a servo motor, the rotation position of which is feedback-controllable. Alternatively, the first actuator 33 may merely need to move or pivot the first clamp members until the first clamp members contact the rubber plug and stop. The first actuator is not limited to an electric motor, and may be, for example, an air-driven actuator. The first actuator is not limited to including a rotatable driving shaft, and may be, for example, like a cylinder including an extendable rod. This is applicable to the other actuators including the second actuator 43 and the movement actuator 53.

In the above-described embodiment, the central line CL extends in a horizontal direction. The central line CL does not need to extend in the horizontal direction. For example, the central line of the rubber plug holding device may extend in a vertical direction or any other direction. There is no limitation on the form of installation of the electric wire insertion device.

In the above-described embodiment, the electric wire 6 is transported to be inserted into the rubber plug 5. The rubber plug holding device 30 may be moved together with the rubber plug. Alternatively, both of the electric wire 6 and the rubber plug 5 may be moved.

In the above-described embodiment, the detection device 70 detecting that the rubber plug 5 has reached the clamp position includes the optical sensor. There is no limitation on the detection system of the detection device. The detection device may include, for example, an image recognition device, a contact switch or the like. It is not needed to detect that the rubber plug 5 has reached the clamp position. For example, elapse of a predetermined time period may be considered to indicate that the rubber plug 5 has reached the clamp position.

The above-described control on the electric wire insertion device 20 is a preferred example, and the control on the electric wire insertion device 20 is not limited to this. For example, the rubber plug holding device 30 may drive only the first clamp members 31 or the second clamp members 41 as necessary. In this case, it is preferred that the small diameter portion 5*b* of the rubber plug 5 may be grasped. For example, during the process of inserting the electric wire 6 into the rubber plug 5, the rubber plug holding device 30 may be once released from the clamped state and re-grasped to have the electric wire 6 inserted thereto.

The rubber plug holding device is not limited to being included in the electric wire insertion device. The rubber plug holding device may be included in any device for which the rubber plug needs to be held. The above-described control on the electric wire insertion device may be performed only on the rubber plug holding device or on the cooperation of the rubber plug holding device and any other device.

REFERENCE SIGNS LIST

5 rubber plug
5*a* long diameter portion
5*b* short diameter portion
5*c* through-hole
6 electric wire
10 rubber plug supply device

20 electric wire insertion device
21 rubber plug supply opening
30 rubber plug holding device
31 first clamp member
31*e* first inner side surface
31*e*1 first rubber plug contact portion
32 support member (first support member)
32*a* shaft (first pivoting shaft)
33 first actuator
33*a* driving shaft
34 first pulley
34*a* first ring portion (ring portion)
34*a*1 outer gear (outer engageable portion)
34*a*2 inner gear (inner engageable portion)
41 second clamp member
41*e*1 second rubber plug contact portion
43 second actuator
50 clamp moving device (moving device)
60 electric wire transportation device
61*b* wall
70 detection device
80 controller
81 setter
82 first position storage (storage)
83 second position storage
84 signal receiver
85 clamp instructor (first controller)
86 first clamp controller (second controller)
87 second clamp controller
88 transportation controller (third controller)
89 moving position storage
90 movement controller (fourth controller)
CL central line

The invention claimed is:

1. A rubber plug holding device, comprising:
a plurality of first clamp members located around a central line extending along a center of the plurality of first clamp members so as to form a space inward of the plurality of first clamp members and in which a rubber plug is allowed to be located;
a first support member supporting the plurality of first clamp members; and
a first actuator to drive the plurality of first clamp members, wherein
the plurality of first clamp members include three or more first rubber plug contact portions in the space and to be in contact with an outer circumferential surface of the rubber plug,
the first support member supports the plurality of first clamp members such that the three or more first rubber plug contact portions get closer to, or farther from, the central line,
the first actuator drives the plurality of first clamp members such that the three or more first rubber plug contact portions get closer to, or farther from, the central line,
the first support member includes a plurality of first pivoting shafts each extending parallel to the central line and respectively supporting the plurality of first clamp members such that the plurality of first clamp members are pivotable, and
the first actuator pivots the plurality of first clamp members about the plurality of first pivoting shafts respectively.

2. The rubber plug holding device according to claim 1, wherein the plurality of first clamp members are provided in the number of three or more.

3. The rubber plug holding device according to claim 1, wherein:

the plurality of first clamp members each include a first inner side surface that is in the space inward of the plurality of first clamp members and is structured such that different regions of the first inner side surface along a circumferential direction of the plurality of first pivoting shafts have different distances from the plurality of first pivoting shafts; and the three or more first rubber plug contact portions are provided at the first inner side surfaces and get closer to, or farther from, the central line by the plurality of first clamp members pivoting about the plurality of first pivoting shafts.

4. The rubber plug holding device according to claim 3, wherein:

the first actuator includes a driving shaft, the rubber plug holding device further comprises:

a first pulley including a ring portion having an outer engageable portion in an outer side surface thereof and an inner engageable portion in an inner side surface thereof, the first pulley being rotatable about the central line, and a transfer mechanism engageable with the outer engageable portion of the first pulley and the driving shaft of the first actuator, the transfer mechanism transferring a rotation of the driving shaft to the first pulley, and the plurality of first clamp members each include a first engageable portion located inward of the ring portion in a radial direction and engageable with the inner engageable portion, the plurality of first clamp members pivoting about the plurality of first pivoting shafts by the first pulley rotating.

5. The rubber plug holding device according to claim 1, further comprising:

a plurality of second clamp members located around the central line so as to form a space inward of the plurality of second clamp members and in which the rubber plug is allowed to be located;

a second support member supporting the plurality of second clamp members; and a second actuator to drive the plurality of second clamp members, wherein the plurality of second clamp members include three or more second rubber plug contact portions located at different positions, in a direction in which the central line extends, from the three or more first rubber plug contact portions, the three or more second rubber plug contact portions configured to be in contact with the outer circumferential surface of the rubber plug, the second support member supports the plurality of second clamp members such that the three or more second rubber plug contact portions get closer to, or farther from, the central line, and the second actuator drives the plurality of second clamp members such that the three or more second rubber plug contact portions get closer to, or farther from, the central line.

6. An electric wire insertion device inserting an electric wire into a through-hole of a rubber plug, the through-hole being along an axis of the rubber plug, the electric wire insertion device comprising:

the rubber plug holding device according to claim 1;

a rubber plug supply opening in communication with the space inward of the plurality of first clamp members, the rubber plug being supplied through the rubber plug supply opening; and an electric wire transportation device to transport the electric wire along the central line.

7. The electric wire insertion device according to claim 6, further comprising:

a detection device to detect whether or not the rubber plug is at a predetermined position, along the central line, at which the plurality of first clamp members are capable of grasping the rubber plug; and a controller connected with the first actuator and the detection device, wherein the controller includes a first controller to cause the first actuator to operate such that the three or more first rubber plug contact portions get closer to the central line when the detection device detects that the rubber plug is at the predetermined position.

8. The electric wire insertion device according to claim 6, further comprising a wall against which a front end, in a rubber plug advancing direction, of the rubber plug collides such that the rubber plug stops at a predetermined position, along the central line, at which the plurality of first clamp members are capable of grasping the rubber plug.

9. The electric wire insertion device according to claim 6, further comprising a controller connected with the first actuator, wherein the controller includes:

a setter to set a type of the rubber plug to be supplied, a storage to store a position of the first actuator for each of types of the rubber plug, and a second controller to control the first actuator based on the setting performed by the setter and the position stored on the storage, to control positions of the three or more first rubber plug contact portions with respect to the central line.

10. The electric wire insertion device according to claim 6, further comprising a controller connected with the first actuator, wherein the controller includes:

a storage to store a pre-insertion position as a position of the first actuator before the electric wire is inserted into the rubber plug and a post-insertion position as a position of the first actuator after the electric wire is inserted into the rubber plug, and a second controller to control the first actuator based on the pre-insertion position and the post-insertion position stored in the storage, to control positions of the three or more first rubber plug contact portions with respect to the central line.

11. The electric wire insertion device according to claim 10, wherein the three or more first rubber plug contact portions at post-insertion positions after the electric wire is inserted into the rubber plug are located farther from the central line than the three or more first rubber plug contact portions at pre-insertion positions before the electric wire is inserted into the rubber plug.

12. The electric wire insertion device according to claim 6, further comprising a moving device to move the rubber plug holding device parallel to the central line.

13. The electric wire insertion device according to claim 12, further comprising a controller connected with the electric wire transportation device and the moving device, wherein the controller includes:

a third controller to control the electric wire transportation device to transport the electric wire from an area outside the rubber plug holding device toward the space inward of the plurality of first clamp members, to insert the electric wire into the rubber plug, and a fourth controller to control the moving device after the electric wire transportation device starts inserting the electric wire into the rubber plug, to move the rubber plug holding device in a transportation direction of the electric wire, and to control the moving device after the rubber plug holding device is moved in the transportation direction of the electric wire, to move the rubber plug holding device in a direction opposite to the transportation direction of the electric wire.

* * * * *